Patented Dec. 3, 1940

2,224,035

UNITED STATES PATENT OFFICE 2,224,035

ADHESIVE COMPOSITION

John H. Long, Wilmington, Del., assignor to Hercules Powder Company, Wilmington, Del., a corporation of Delaware No Drawing. Application April 1, 1938, Serial No. 199,443

6 Claims. (Cl. 260—75)

This invention relates to an improved adhesive composition and to a laminated article bonded therewith.

The adhesive composition in accordance with this invention will comprise a mixture of two or more synthetic resins which are esterification products of different aliphatic glycols with a terpene-maleic anhydride condensation product, and in its preferred form will usually comprise a mixture of esters of ethylene glycol, diethylene glycol and triethylene glycol, respectively, with a terpene-maleic anhydride condensation product.

This adhesive composition has excellent adhesion for both porous and non-porous surfaces and is suitable for bonding a wide variety of different types of surfaces. It is resistant to discoloration by light and has excellent resistance to both water and moisture-vapor. It is, likewise, resistant to paraffin type oils and glyceride oils, including both animal and vegetable oils. It is transparent, light in color and of high gloss. It may be conveniently applied as a thermoplastic and thereby avoid the cost of solvent or solvent recovery. It may, however, be utilized in the form of a solution in a volatile solvent if desired.

The laminated article in accordance with this invention will comprise two sheets bonded by means of this adhesive composition. The two sheets so bonded may be of the same or different materials and may be, for example, paper, cardboard, regenerated cellulosic film, cellulose acetate film, metal foil, cloth, etc. This laminated article is particularly advantageous in its excellent resistance to moisture-vapor, water, glyceride oils and paraffin oils, and a permanence on aging. When one or both of the sheets of materials bonded to form the laminated article are transparent in nature, the laminated article will be found particularly advantageous, in that the bonding composition does not detract from the clarity and brilliance of the transparent sheet and does not discolor on exposure to light and thus, detract from the appearance of the lamination on exposure to sunlight and on aging.

The synthetic resins which I utilize in my adhesive composition are esterification products of a glycol such as, for example, ethylene glycol, diethylene glycol and triethylene glycol with a condensation product of maleic anhydride or maleic acid with a terpene such as, for example, terpinene, terpineol, dipentene, pinene, etc. and may be produced following the procedures described in U. S. Patent 1,993,025 to Ernest G. Peterson and Edwin R. Littmann, U. S. Patents 1,993,027, 1,993,031, and 1,993,032 to Ernest G. Peterson, U. S. Patent 1,993,034 to Irvin W. Humphrey and U. S. Patent 1,993,035 to Edwin R. Littmann. In general, I have found that the glycol esters of terpinene-maleic anhydride are particularly satisfactory for use in my adhesive compositions.

My adhesive composition may be a mixture of ethylene glycol ester of terpene-maleic anhydride, the diethylene glycol ester of terpene-maleic anhydride, and the triethylene glycol ester of terpene-maleic anhydride. Again, it may be a mixture of the ethylene glycol ester of terpene-maleic anhydride and the diethylene glycol ester of terpene-maleic anhydride, it may be a mixture of the ethylene glycol ester of terpene-maleic anhydride and the triethylene glycol ester of terpene-maleic anhydride or it may even be a mixture of the diethylene glycol ester of terpene-maleic anhydride and the triethylene glycol ester of terpene-maleic anhydride.

The relative proportions of the two or three synthetic resins which I use in my adhesive composition will depend upon the characteristics of the surfaces which I intend to bond therewith. The mixture will ordinarily be formulated to have a melting point within the range of about 40° C. to about 90° C. and I have found that I ordinarily prefer to formulate the mixture so that it has a melting point within the more narrow range of about 65° C. to about 75° C.

In the formulation of the adhesive composition in accordance with this invention, it will be found that the ethylene glycol ester of the terpene-maleic anhydride condensates contributes hardness to the adhesive compositions, the diethylene glycol ester of terpene-maleic anhydride condensates contributes toughness and the triethylene glycol ester of terpene-maleic anhydride condensates contribute tackiness or stickiness to the composition. It will be seen that by an adjustment of the relative proportions of each of these three ingredients, a wide variety of properties can be obtained.

I have found that the compositions within the ranges of proportions given in Table I are particularly valuable adhesive compositions.

TABLE I

| Triethylene glycol ester of terpene-maleic anhydride | Diethylene glycol ester of terpene-maleic anhydride | Ethylene glycol ester of terpene-maleic anhydride |
|---|---|---|
| Percent | Percent | |
| 50–75 | 0 | To total 100% |
| 45–70 | 10 | Do. |
| 40–70 | 20 | Do. |
| 35–65 | 30 | Do. |
| 30–60 | 40 | Do. |
| 25–50 | 50 | Do. |
| 25–40 | 60 | Do. |
| 20–30 | 70 | Do. |
| 20 | 80 | Do. |

The compositions which I usually prefer to use fall within the ranges given in Table 2.

TABLE 2

| Ethylene glycol ester of terpene-maleic anhydride | Diethylene glycol ester of terpene-maleic anhydride | Triethylene glycol ester of terpene-maleic anyhdride |
|---|---|---|
| Percent | Percent | |
| 10 | 30–50 | To total 100% |
| 15 | 25–50 | Do. |
| 20 | 25–45 | Do. |
| 25 | 25–35 | Do. |

In addition to the glycol esters of terpene-maleic anhydride condensates which the adhesive composition in accordance with this invention will contain, it may also contain other modifying ingredients as other resins such as, for example, rosin and/or plasticizers as dibutyl phthalate, butylphthalylbutylglycollate, tricresyl phosphate, etc. Such modifying ingredients are, however, not ordinarily essential and frequently serve only to detract from the desirable properties of my compositions.

The adhesive composition in accordance with this invention may be prepared by melting together the desired synthetic resins to produce a homogeneous admixture. The preparation of an adhesive composition in accordance with this invention following this procedure is illustrated by the following example:

EXAMPLE I

Three synthetic resins were prepared as follows:

Resin A

The following ingredients were heated together with good agitation at a temperature of 205–215° C. for approximately 7–8 hours:

Parts
Terpinene-maleic anhydride reaction product. (Prepared according to E. G. Peterson and Edwin R. Littmann Patent 1,993,025_____ 100
Monoethylene glycol_____ 36

The excess glycol and the by-products of the reaction were removed by the application of reduced pressure at the end of the reaction. As a result of this treatment, a hard pale yellow resinous solid was formed which had an acid number of about 40–45 and a drop melting point of about 90–100° C.

Resin B

This resin was prepared by reacting the following ingredients by the procedure described for Resin A for a period of 6–7 hours:

Parts
Terpinene-maleic anhydride reaction product_____ 225
Diethylene glycol_____ 115

As a result of this treatment, a fairly soft pale yellow resinous solid was formed which had an acid number of about 40–50 and a drop melting point of about 65–75° C.

Resin C

The following ingredients were reacted by the procedure described for Resin A for a period of approximately 6–7 hours:

Parts
Terpinene-maleic anhydride reaction product_____ 225
Triethylene glycol_____ 165

The product had an acid number of about 40–50 and a drop melting point of about 55° C.

A mixture of 20 parts by weight of Resin A, 40 parts by weight of Resin B and 40 parts by weight of Resin C, each prepared as indicated above, were blended at a temperature of about 150° C. by vigorous stirring. The product was a soft pale yellow resinous material which had an acid number of about 40–50 and a drop melting point of about 65–75° C. This adhesive composition is suitable, for example, for sealing cellulose acetate film to paper and it may be applied in a molten state to either of the surfaces in a thin film and the layers laminated by heat and pressure. The adhesive bonds so formed will be found to be so strong that attempts to separate the paper from the cellulose acetate film results in rupture in the surfaces of the paper rather than the separation at the bond. Since the adhesive film is very light in color and highly transparent, printed matter on the paper surfaces shows up well through the acetate film.

Instead of proceeding as illustrated by the above Example I, I may prepare my adhesive composition by the reaction of a terpene-maleic anhydride condensate with a mixture of different glycols in suitable proportions. The adhesive composition made in this way is fully equivalent to that prepared by the procedure of Example I in which the glycol esters are prepared separately and then blended into an adhesive composition. This alternate procedure is illustrated by the following examples:

EXAMPLE II

The following ingredients were agitated at a temperature of 210–220° C. for approximately 6–7 hours:

Parts
Terpinene-maleic anhydride reaction product_____ 1000
Monoethylene glycol_____ 110
Diethylene glycol_____ 234
Triethylene glycol_____ 234

The excess glycol and other by-products of the reaction are then removed by distillation under reduced pressure. As a result of this treatment a soft pale yellow resinous adhesive was formed which had an acid number of about 40–50 and a drop melting point of 65–75° C. This adhesive composition was applied to paper in the form of a thin film while molten. The paper was then sealed to a metal foil surface by the application of heat and pressure. The resulting laminated structure was found to be bonded so tightly that an attempt to separate the two sheets resulted in a rupture of the surface of the sheets rather than a rupture of the bond itself.

EXAMPLE III

The following ingredients were reacted at about 210 to 220° C. for a period of approximately 9–12 hours:

| | Parts |
|---|---|
| Terpinene-maleic anhydride reaction product | 1000 |
| Rosin | 260 |
| Monoethylene glycol | 110 |
| Diethylene glycol | 217 |
| Triethylene glycol | 177 |

The excess glycols and other by-products of the reaction were removed by the application of reduced pressure. As a result of this treatment a fairly soft pale yellow resinous adhesive material was formed which had an acid number of about 45–55 and a drop melting point of about 60–70° C. This adhesive material was applied in a thin film while molten to a regenerated cellulosic film. The cellulosic film was then laminated with heat and pressure to cardboard. The resulting laminated structure was found to be so tightly bonded that an attempt to separate the two bonded sheets resulted in a rupture of the cardboard surfaces.

It will be understood that the details and examples given herein are by way of illustration and not by way of limitation of the invention as broadly described and claimed.

What I claim and desire to protect by Letters Patent is:

1. An adhesive composition which comprises an admixture of at least two synthetic resins which are esterification products of a terpene-maleic anhydride condensate and a glycol and which are esterification products of different glycols, the said esters being in amount and so proportioned to produce a flexible, strongly adhesive composition adapted for the lamination of flexible sheet material and characterized by permanence on aging and resistance to water, moisture vapor, glyceride oils and hydrocarbon oils.

2. An adhesive composition which comprises an admixture of the ethylene glycol ester of a terpene-maleic anhydride condensate, the diethylene glycol ester of a terpene-maleic anhydride condensate and the triethylene glycol ester of a terpene-maleic anhydride condensate, the said esters being in amount and so proportioned to produce a flexible, strongly adhesive composition adapted for the lamination of flexible sheet material and characterized by permanence on aging and resistance to water, moisture vapor, glyceride oils and hydrocarbon oils.

3. An adhesive composition which comprises an admixture of the ethylene glycol ester of terpinene-maleic anhydride condensate, the diethylene glycol ester of a terpinene-maleic anhydride condensate and the triethylene glycol ester of a terpinene-maleic anhydride condensate, the said esters being in amount and so proportioned to produce a flexible, strongly adhesive composition adapted for the lamination of flexible sheet material and characterized by permanence on aging and resistance to water, moisture vapor, glyceride oils and hydrocarbon oils.

4. An adhesive composition which comprises an admixture of the ethylene glycol ester of a terpinene-maleic anhydride condensate, and the diethylene glycol ester of a terpinene-maleic anhydride condensate, the said esters being in amount and so proportioned to produce a flexible, strongly adhesive composition adapted for the lamination of flexible sheet material and characterized by permanence on aging and resistance to water, moisture vapor, glyceride oils and hydrocarbon oils.

5. An adhesive composition which comprises an admixture of between 20 and 75% of the triethylene glycol ester of a terpene-maleic anhydride condensate, between 0 and 80% of the diethylene glycol ester of a terpene-maleic anhydride condensate, and a quantity to total 100% of the ethylene glycol ester of a terpene-maleic anhydride condensate.

6. An adhesive composition which comprises an admixture of between 10 and 25% of the ethylene glycol ester of a terpene-maleic anhydride condensate, between 25 and 50% of the diethylene glycol ester of a terpene-maleic anhydride condensate and a quantity to total 100% of the triethylene glycol ester of a terpene-maleic anhydride condensate.

JOHN H. LONG.